United States Patent [19]

Fehrenbach

[11] 4,325,349
[45] Apr. 20, 1982

[54] AIR VALVE FOR A FUEL SUPPLY SYSTEM

[75] Inventor: Siegfried Fehrenbach, Markgröningen, Fed. Rep. of Germany

[73] Assignee: Robert Bosch GmbH, Stuttgart, Fed. Rep. of Germany

[21] Appl. No.: 167,620

[22] Filed: Jul. 11, 1980

[30] Foreign Application Priority Data

Aug. 18, 1979 [DE] Fed. Rep. of Germany ....... 2933589

[51] Int. Cl.³ .............................................. F02M 7/12
[52] U.S. Cl. .................................... 123/587; 123/327; 137/110; 261/DIG. 19
[58] Field of Search ....... 123/585, 587, 327, DIG. 11; 261/DIG. 19; 137/110

[56] References Cited

U.S. PATENT DOCUMENTS

| 1,996,219 | 4/1935 | Thomas | 123/587 |
| 3,949,717 | 4/1976 | Rittmannsberger | 123/587 X |
| 4,257,227 | 3/1981 | Sato et al. | 123/587 X |
| 4,276,746 | 7/1981 | Yamanaka et al. | 123/587 X |
| 4,289,100 | 9/1981 | Kinugawa et al. | 123/585 X |

Primary Examiner—William A. Cuchlinski, Jr.

Attorney, Agent, or Firm—Edwin E. Greigg

[57] ABSTRACT

An air valve for a fuel supply system of an internal combustion engine is proposed, which assures good start-up of the engine and furnishes a fuel-air mixture required for combustion during overrunning. The air valve includes a housing, which is separated by a diaphragm into a first chamber and a second chamber. The first chamber communicates with the intake tube section downstream of a throttle valve and the second chamber comunicates first with the intake tube upstream of the throttle valve and second with the intake tube downstream of the throttle valve. A valve plate guided by the diaphragm engages a valve seat sheath which is slidably supported in a mouthpiece. A flow cross section is formed between the valve seat sheath and the mouthpiece. Immediately following starting, additional air can bypass the throttle valve for the purpose of improved starting up of the engine. Upon attainment of a certain underpressure, the valve seat sheath is displaced in such a manner that a sealing step closes the flow cross section. At under pressures characterized by overrunning, the valve plate rises from the valve seat sheath and enables the supply of additional air to the engine.

3 Claims, 1 Drawing Figure

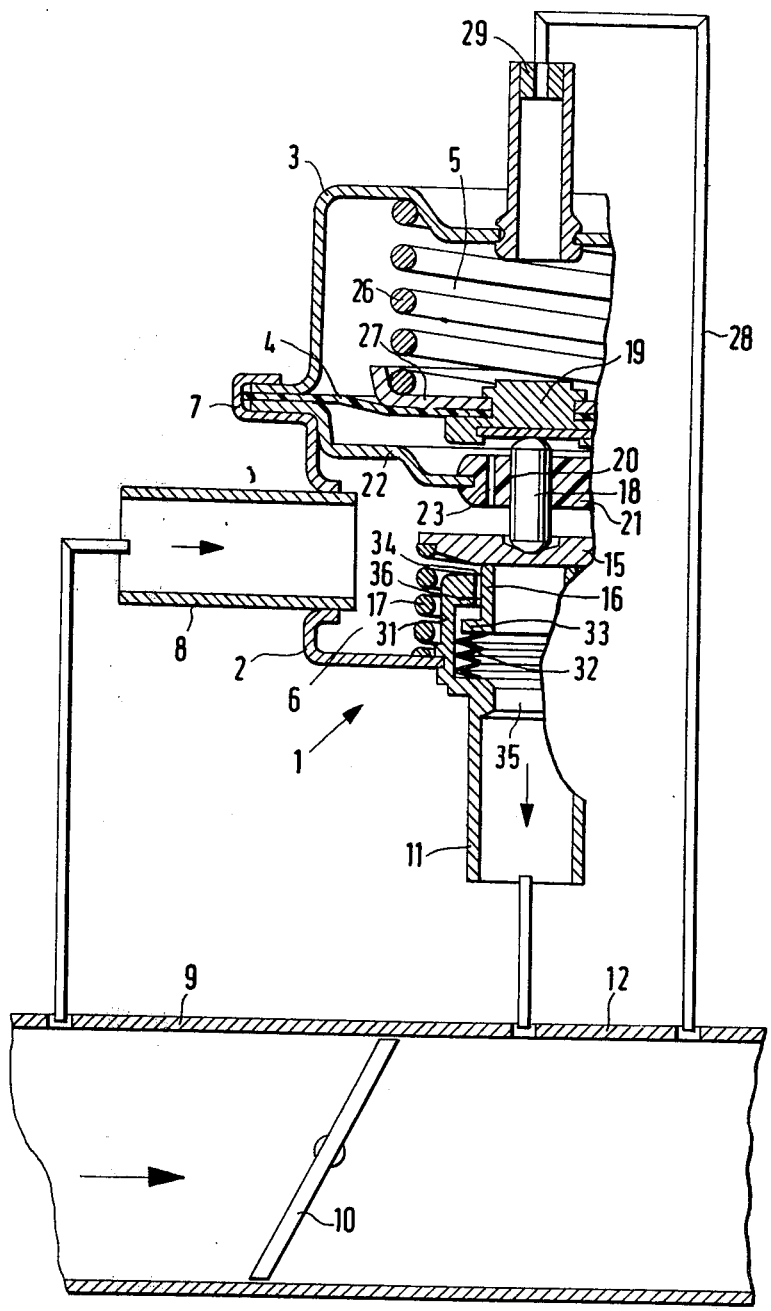

AIR VALVE FOR A FUEL SUPPLY SYSTEM

BACKGROUND OF THE INVENTION

The invention relates in general to fuel supply system for internal combustion engines having a throttle valve disposed in an air intake tube, and more particularly, to an air valve for varying the cross-sectional area of a throttle valve by-pass. An air valve is already known which, in order to influence the fuel-air mixture during engine overrunning, responds to the pressure drop occurring in the intake tube upon the abrupt closing of the throttle valve and delivers a predetermined air quantity to the closed throttle valve. This quantity of air is sufficient to maintain combustion in the individual cylinders of the internal combustion engine during overrunning. A further air valve is also known which permits an additional air quantity to flow past the throttle valve via a bypass in order to improve the starting behavior of the engine. Thus, to fulfill both of these functions, two separate air valves and a large number of connections are required with devices of the prior art.

OBJECT AND SUMMARY OF THE INVENTION

The air valve according to the invention has the following advantages over the general prior art discussed above. Improved engine starting behavior and the influence of the fuel-air mixture during overrunning is done by means of a single air valve. The structure is compact and the number of required connections is also reduced.

As a result of the characteristics of the invention, advantageous further modifications of and improvements to the air valve as disclosed are possible.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows in cross section, one exemplary embodiment of the invention.

DESCRIPTION OF THE PREFERRED EMBODIMENT

The air valve 1 has a housing made up of two housing parts 2 and 3, which is divided by a diaphragm 4 into a first chamber 5 and a second chamber 6. The diaphragm 4 is clamped on the flanged rim 7 connecting the two housing parts 2 and 3. A first pressure line 8 discharges into the second chamber 6 and communicates with an intake tube section 9 upstream of a throttle valve 10. A second pressure line 11 also discharges into the second chamber 6 and communicates with an intake tube section 12 downstream of the throttle valve 10.

A disc-like valve plate 15 is disposed in the second chamber 6. In the operational state shown in the drawing, the valve plate 15 rests on a valve seat sheath 16 and is engaged by a valve spring 17, whose other end rests on the bottom of housing part 2. A pressure pin 18 is disposed between the valve plate 15 and the diaphragm 4. The pressure pin 18 and the valve plate 15 constitute a movable valve element assembly which engages the diaphragm 4. The pressure pin 18 is supported via a central reinforcement disc 19 on the diaphragm 4 and is further supported, longitudinally displaceable and free of play, in a longitudinal bore 20 of a hub 21, which is made of plastic, for example, injected or expressed into a guide foil 22. The guide foil 22 is deep-drawn of sheet steel and is fixed on its flange-like end, together with the diaphragm 4, in the flanged rim 7. The spaces in the second chamber 6 which are separated by the guide foil 22 communicate with one another via a throttle opening 23 in the hub 21. The throttle opening 23 effects a damping of the movement of the diaphragm 4. Thus, there are gradual transitions between opening and closing of the air valve, rather than sudden changes.

A compression spring 26 is disposed in the first chamber 5, supported on one end via a spring plate 27 on the diaphragm 4 and on the other end on the bottom of the housing part 3. The force of the compression spring 26 on the diaphragm 4 can be varied by means of pressing in the bottom of the housing part 3 toward the first chamber 5 to a greater or lesser extent. The first chamber 5 communicates via an underpressure line 28 with the intake tube section 12 downstream of the throttle valve 10. By means of a throttle restriction 29, it can be attained that pressure variations in the first chamber 5 first become effective at the diaphragm 4 with a certain time delay. Thus, it is possible to damp vibrations, which are especially severe at relatively low rpm as a result of the fluctuations in pressure caused by the aspiration cycles of the engine.

The valve seat sheath 16 is supported in a mouthpiece 31 in such a manner as to be slidable counter to the force of a starting spring 32, with which the second line 11 projects into the second chamber 6. The starting spring 32 may be embodied as a leaf spring packet. On its end oriented toward the starting spring 32, the valve seat sheath 16 has a sealing step 33. A flow cross section 34 is embodied between the outer circumference of the valve seat sheath 16 and the mouthpiece 31, taking into consideration a suitable guidance of the valve seat sheath 16. In the second line 11, a throttle restriction 35 is provided which limits the maximum flow quantity.

The valve plate 15 and the valve seat sheath define a passage therebetween connecting the second chamber 6 with the second line 11. The compression spring 26 exerts a force on the valve plate 15, through the diaphragm 4 and the pressure pin 18, in a direction to close the valve passage. The valve spring 17 exerts a force on the valve plate 15 in an opposite direction to open the valve passage.

The mode of operation of the illustrated air valve is as follows:

When the mixture-compressing internal combustion engine stops, atmospheric pressure prevails both in the intake tube section 9 upstream of the throttle valve 10 and in the intake tube section 12 downstream of the throttle valve 10, so that atmospheric pressure also prevails in the first chamber 5 and the second chamber 6 of the air valve 1. The force of the compression spring 26 is greater than the counteracting forces of the valve spring 17 and the starting spring 32, so that the valve plate 15 rests on or is biased against the valve seat sheath 16 and pushes it into the mouthpiece 31 into a position in which the flow cross section 34 between the second chamber 6 and the second line 11 is opened. If the engine is now started, then the engine first receives an additional air quantity by way of the bypass formed around the throttle valve 10 by the lines 8 and 11 and the flow cross section 34, so that the engine starts up with sufficient power. Now if the underpressure in the intake tube 12 and thus in the first chamber 5, via the underpressure line 28, reaches a certain value, the diaphragm 4 is moved toward the first chamber 5 and the starting spring 32 displaces the valve seat sheath 16 until the sealing step 33 rests on a stop 36 of the mouthpiece 31 and closes the flow cross section 34 between the second chamber 6 and the second line 11. The underpressure value can be determined by the appropriate selection of the spring forces of the compression spring 26, valve spring 17 and starting spring 32.

The valve plate 15 rests on the supporting valve seat sheath 16 both during the starting procedure and during idling, partial-load and full-load operation. Only at greater underpressures in the suction tube 12 (which characterize engine overrunning) is the closing force of the spring 26, in the direction of the valve plate 15, overcome by the compression force of the underpressured first chamber 5, such that the valve plate 15 disengages or rises from the valve seat sheath 16. Thus additional air can flow out of the intake tube section 9, past the closed throttle valve 10, via the first line 8, the open valve plate 15 and the valve seat sheath 16, and the second line 11. This additional air suffices to maintain combustion in the individual cylinders of the engine during overrunning.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. In a fuel supply system of an internal combustion engine having an air intake tube, an arbitrarily actuatable throttle valve disposed in the air intake tube, and a throttle valve bypass connecting the air intake tube upstream of the throttle valve to the air intake tube downstream of the throttle valve, an air valve means, connected via an underpressure line to the air intake tube downstream of the throttle valve, for varying the cross-sectional area of the throttle valve bypass in accordance with a differential air pressure between the pressure of air within the air intake tube upstream of the throttle valve and the pressure of air within the air intake tube downstream of the throttle valve, the throttle valve bypass comprising the air valve means, a first line connected between the air valve means and the air intake tube upstream of the throttle valve, and a second line connected between the air valve means and the air intake tube downstream of the throttle valve, and the air valve means comprising:

a housing;
a diaphragm which divides the housing into a first chamber and a second chamber, the first chamber communicating with the air intake tube downstream of the throttle valve via the underpressure line, and the second chamber communicating with the air intake tube upstream of the throttle valve via the first line;
a mouthpiece, projecting into the second chamber, having inner and outer ends defining a passage therebetween, the passage communicating with the air intake tube downstream of the throttle valve via the second line connected to the mouthpiece at its outer end, the mouthpiece including a stop;
a valve seat sheath, slidably disposed within the mouthpiece passage for movement in a first direction inwardly toward the diaphragm or in an opposite second direction outwardly from the diaphragm, the valve seat sheath and the mouthpiece defining a flow cross section therebetween connecting the second chamber with the second line, the valve seat sheath including a sealing step which engages the mouthpiece stop to close the flow cross section and determine the innermost position of the valve seat sheath;
a starting spring means for exerting a force on the valve seat sheath in the first direction;
a movable valve element, disposed in the second chamber and engaging the diaphragm, the valve element and the valve seat sheath defining a valve passage therebetween connecting the second chamber with the second line, the valve element being movable in the second direction to a closed position at which it engages the valve seat sheath and closes the valve passage and the valve element being movable in the first direction from its closed position to reopen the valve passage;
first valve spring means for exerting a force on the diaphragm and valve element in the first direction; and
second valve spring means for exerting a force on the diaphragm and valve element in the second direction;
wherein the starting spring means, the first valve spring means and the second valve spring means are selected so that (1) when the air differential pressure is less than a first predetermined value indicating a non-running or starting condition of the engine, the valve element and valve seat sheath are disposed such that the flow cross section is open and the valve passage closed, (2) when the air differential pressure is at least equal to the first predetermined value but less than a second predetermined value, the valve element and valve seat sheath are disposed such that both the flow cross section and the valve passage are closed, and (3) when the air differential pressure is at least equal to the second predetermined value indicating an engine overrunning condition, the valve element and valve seat sheath are disposed such that the flow cross section is closed and the valve passage is open.

2. An air valve as described by claim 1, characterized in that the starting spring means is embodied by a leaf spring packet.

3. An air valve as described by claim 1, which further comprises throttle restriction, disposed in the second line, which limits the maximum flow-through quantity of the second line.

* * * * *